(12) United States Patent
Matusik et al.

(10) Patent No.: US 10,834,372 B2
(45) Date of Patent: Nov. 10, 2020

(54) 3DTV AT HOME: EULERIAN-LAGRANGIAN STEREO-TO-MULTI-VIEW CONVERSION

(71) Applicant: Massachusetts Institute of Technology, Cambridge, MA (US)

(72) Inventors: Wojciech Matusik, Lexington, MA (US); Piotr K. Didyk, Homburg (DE); William T. Freeman, Acton, MA (US); Petr Kellnhofer, Cambridge, MA (US); Pitchaya Sitthi-Amorn, Cambridge, MA (US); Frederic Durand, Somerville, MA (US); Szu-Po Wang, San Francisco, CA (US)

(73) Assignee: Massachusetts Institute of Technology, Cambridge, MA (US)

( * ) Notice: Subject to any disclaimer, the term of this patent is extended or adjusted under 35 U.S.C. 154(b) by 133 days.

(21) Appl. No.: 16/000,662

(22) Filed: Jun. 5, 2018

(65) Prior Publication Data
US 2018/0352208 A1 Dec. 6, 2018

Related U.S. Application Data

(60) Provisional application No. 62/515,193, filed on Jun. 5, 2017.

(51) Int. Cl.
*H04N 13/111* (2018.01)
*G06T 7/593* (2017.01)
*H04N 13/128* (2018.01)

(52) U.S. Cl.
CPC ............ *H04N 13/111* (2018.05); *G06T 7/593* (2017.01); *H04N 13/128* (2018.05);
(Continued)

(58) Field of Classification Search
CPC .. H04N 13/111; H04N 13/128; H04N 13/106; H04N 2013/0081; G06T 7/593;
(Continued)

(56) References Cited

U.S. PATENT DOCUMENTS 8,532,410 B2    9/2013  Tian
2011/0304706 A1* 12/2011  Border ................... G03B 35/02
                                                   348/50
(Continued)

OTHER PUBLICATIONS

International Search Report and Written Opinion of rPCT/US2018/036105 dated Oct. 29, 2018 entitled "3dtv at Home: Eulerian-Lagrangian Stereo-To-Multi-View Conversion".
(Continued)

*Primary Examiner* — Allen C Wong
(74) *Attorney, Agent, or Firm* — Hamilton, Brook, Smith & Reynolds, P.C.

(57) ABSTRACT

A method and system of converting stereo video content to multi-view video content combines an Eulerian approach with a Lagrangian approach. The method comprises generating a disparity map for each of the left and right views of a received stereoscopic frame. For each corresponding pair of left and right scanlines of the received stereoscopic frame, the method further comprises decomposing the left and right scanlines into a left sum of wavelets or other basis functions, and a right sum wavelets or other basis functions. The method further comprises establishing an initial disparity correspondence between left wavelets and right wavelets based on the generated disparity maps, and refining the initial disparity between the left wavelet and the right wavelet using a phase difference between the corresponding wavelets. The method further comprises reconstructing at least one novel view based on the left and right wavelets.

20 Claims, 13 Drawing Sheets
(11 of 13 Drawing Sheet(s) Filed in Color)

(52) U.S. Cl.
CPC ............... *G06T 2207/10021* (2013.01); *G06T 2207/20016* (2013.01); *G06T 2207/20056* (2013.01); *G06T 2207/20064* (2013.01); *G06T 2207/20228* (2013.01)

(58) Field of Classification Search
CPC ............. G06T 7/97; G06T 2207/20228; G06T 2207/20056; G06T 2207/20016; G06T 2207/20064; G06T 2207/10021
USPC .......................................................... 348/46
See application file for complete search history.

(56) References Cited

U.S. PATENT DOCUMENTS

| | | |
|---|---|---|
| 2014/0192076 A1 | 7/2014 | Tan |
| 2015/0124062 A1 | 5/2015 | Didyk |
| 2016/0300339 A1* | 10/2016 | Jiang .................... H04N 13/161 |
| 2016/0373715 A1* | 12/2016 | Nguyen .................. G06T 15/08 |
| 2017/0161921 A1* | 6/2017 | Tian ....................... G06T 11/003 |
| 2018/0205909 A1* | 7/2018 | Staranowicz .......... H04N 11/20 |

OTHER PUBLICATIONS

Wang "Eulerian-Lagrangian Stereo-to-Multi-view Conversion." In: Massachusetts Institute of Technology, Department of Electrical Engineering and Computer Science, Jan. 29, 2016., [online] [retrieved on Oct. 3, 2018 (Apr. 10, 2018)] Retrieved from the Internet <URL: https://dspace.mit.edu/handle/1721.1/106448>, entire document, especially Abstract; p. 14-15; 22-26.

Kellnhofer et al. "3DTV at Home: Eulerian-Lagrangian Stereo-to-Multiview Conversion." In: ACM Transactions on Graphics (TOG) TOG, vol. 36 Issue 4, Jul. 2017, [online] [retrieved on Oct. 3, 2018 (Apr. 10, 2018)] Retrieved from the Internet <URL: https://dl.acm.org/citation.cfm?id=3078617>; entire document.

\* cited by examiner

3DTV AT HOME: EULERIAN-LAGRANGIAN STEREO-TO-MULTI-VIEW CONVERSION

RELATED APPLICATION(S)

This application claims the benefit of U.S. Provisional Application No. 62/515,193, filed on Jun. 5, 2017. The entire teachings of the above application are incorporated herein by reference.

BACKGROUND

The popularity of stereoscopic 3D (S3D) has increased substantially during the last decade. Today, many movie blockbusters are released in a stereo format. However, the popularity of S3D in the movie theaters has not translated to equivalent popularity at homes. Despite the fact that most current television sets support S3D and the content providers offer streaming stereoscopic content, the adoption of S3D at home remains very low. It is widely believed that the use of stereoscopic glasses is not practical in a home setting, and that a better approach to S3D at home is the use of automultiscopic displays that provide a glasses-free, three-dimensional (3D) stereoscopic experience to multiple viewers. These displays are rapidly improving due to the industry drive for a higher and higher display resolution (e.g., even current 4K UHD displays can be easily converted to a 3D automultiscopic display with 8 views and an HD spatial resolution). However, using these displays presents one fundamental challenge—while there is plenty of stereoscopic content available, there is practically no multi-view content for automultiscopic displays. Therefore, there is a clear need for methods and systems that can convert streaming, high-resolution, stereoscopic video available from the standard delivery channels to high-quality, multi-view content in real time. Furthermore, the methods should be amenable to hardware implementations such that they can be incorporated in future streaming TV devices and smart TV sets. Finally, the systems should support some customization of the 3D video, because viewers may desire different levels of the 3D experience.

SUMMARY

The described embodiments of an Eulerian-Lagrangian stereo-to-multi-view conversion method and system may be used to provide a three-dimensional television (3DTV) experience in the homes of ordinary consumers. The described embodiments expand existing stereoscopic content to a high-quality, multi-view format in real time. As used herein, the term "real time" refers to actions perceived to occur with little or no delay by an ordinary viewer. The methods of the described embodiments may be implemented efficiently in hardware and naturally support disparity manipulations. The standard depth image-based rendering methods of prior approaches are limited to small disparities. The described embodiments overcome this limitation by combining a phase-based approach (i.e., an Eulerian approach) with standard depth image-based rendering (i.e., a Lagrangian approach).

Example embodiments described herein may decompose the stereoscopic input signal using a set of filters inspired by a steerable pyramid decomposition. The basis functions of this transform may resemble Gabor-like wavelets. Accordingly, the example embodiments described herein may refer to the basis functions as wavelets, although decomposition based on other basis functions may also be used. The disparity information may be estimated for each of the wavelets separately, using a combination of standard disparity estimation and phase-based measures. To synthesize new views, the described embodiments may apply a wavelet re-projection, which moves wavelets according to their disparities. Such an approach may handle large disparities, while preserving all the advantages of the Eulerian approach. The example embodiments described herein demonstrate that real-time performance may be provided both on a graphics processing unit (GPU), and a field-programmable gate array (FPGA).

In one aspect, the invention may be a method of converting stereo video content to multi-view video content that combines an Eulerian approach with a Lagrangian approach. The method may comprise decomposing a stereoscopic input using a set of basis functions to produce a set of decomposed signals of one or more frequencies, estimating disparity information for each of the decomposed signals, and synthesizing novel views by re-projecting the decomposed signals, the re-projecting comprising moving the decomposed signals according to the disparity information.

In an embodiment, the decomposed signals may be a sum of basis functions of the form $$\hat{b}_f(\xi) = \cos\left(\frac{\pi}{2}\log_w(\xi/f)\right)\cdot \Pi\left(\frac{1}{2}\log_w(\xi/f)\right).$$

The method may further comprise generating a disparity map for each of a left view and a right view of the stereoscopic input, and establishing an initial disparity correspondence, between each of a corresponding set of left and right decomposed signals, based on the generated disparity maps;

The method may further comprise generating a disparity map for each of the left and right views of a received stereoscopic frame, and, for each corresponding pair of left and right scanlines of the received stereoscopic frame, decomposing the left and right scanlines into a left wavelet and a right wavelet, each of the wavelets being a sum of basis functions. The method may further comprise establishing an initial disparity correspondence between the left wavelet and the right wavelet based on the generated disparity maps, refining the initial disparity between the left wavelet and the right wavelet using a phase difference between the corresponding wavelets and reconstructing at least one novel view based on the left and right wavelets.

In an embodiment, the basis functions may be of the form $$\hat{b}_f(\xi) = \cos\left(\frac{\pi}{2}\log_w(\xi/f)\right)\cdot \Pi\left(\frac{1}{2}\log_w(\xi/f)\right).$$

The method may further comprise determining a per-wavelet disparity as an average of disparities in a local neighborhood of the wavelet, the size of which is substantially equal to spacing of associated wavelets.

The the per-wavelet disparity of a wavelet $\psi_{rfx}$ may be given by $d_{rfx} = \Sigma_{y=x-s/2}^{x+s/2} |D_r(y)|/(s+1)$, where $s=|I_r|/|X_f|$, and $D_r(y)$ is a disparity map associated with the wavelet $\psi_{rfx}$.

In an embodiment, refining the initial disparity may further comprise transforming the phase difference into a disparity residual by multiplying the phase difference by $f/2\pi$, where f is a frequency associated with the wavelet, and adding the disparity residual to the initial disparity determination to produce a per-wavelet refined disparity estimate.

The method may further comprise filtering the per-wavelet disparity estimate using a two-dimensional mean filter having a kernel size equal to double wavelet spacing of neighboring wavelets.

In an embodiment, reconstructing at least one novel view may comprise determining a new position of each wavelet to specify a displaced wavelet, wherein the new position is x+a·d, x being a location of the wavelet, d being a disparity of the wavelet and a being a constant. Reconstructing at least one novel view may further comprise converting the displaced wavelet to be uniformly-spaced, using a non-uniform Fourier transform, and reconstructing a displaced one-dimensional scanline signal based on the displaced wavelet, using pyramid reconstruction.

In another aspect, the invention may be a system for converting stereo video content to multi-view video content. The system may comprise a frame duplicator configured to receive a stereoscopic frame and produce a first stereoscopic frame copy and a second stereoscopic frame copy therefrom. The system may further comprise a pyramid decomposition processor configured to receive the first stereoscopic frame copy and produce a first pyramid corresponding to the first stereoscopic frame copy and a second pyramid corresponding to the first stereoscopic frame copy. The system may further comprise a disparity processor configured to receive the second stereoscopic frame copy, and decomposition information from the pyramid decomposition processor, and to produce disparity information therefrom. The system may further comprise a re-projection processor configured to receive the first pyramid and the second pyramid from the pyramid decomposition processor, and disparity information from the disparity processor, and to produce pyramid re-projection information therefrom. The system may further comprise a pyramid reconstruction processor configured to receive the re-projection information from the wavelet re-projection processor and to produce at least one novel view therefrom.

In one embodiment, the pyramid decomposition processor may produce the first pyramid and the second pyramid as a sum of basis functions having the form $$\hat{b}_f(\xi) = \cos\left(\frac{\pi}{2}\log_w(\xi/f)\right) \cdot \Pi\left(\frac{1}{2}\log_w(\xi/f)\right).$$

The disparity processor may (i) generate a disparity map for each of a left view and a right view of the stereoscopic frame and (ii) establish an initial disparity correspondence between a left pyramid and a right pyramid based on the generated disparity maps.

The disparity processor may further refine the initial disparity between the left and right pyramid functions using a phase difference between the corresponding pyramid functions. The disparity processor may determine a per-pyramid function disparity as an average of disparities in a local neighborhood of the pyramid function, the size of which is substantially equal to spacing of associated pyramid functions.

The per-pyramid disparity $d_{rfx}$ of a pyramid $\psi_{rfx}$ may be given by $d_{rfx} = \Sigma_{y=x-s/2}^{x+s/2} |D_r(y)|/(s+1)$, where $s=|I_r|/|X_f|$, and $Dr(y)$ is a disparity map associated with the pyramid $\psi_{rfx}$.

The disparity processor may be further configured to transform the phase difference into a disparity residual by multiplying the phase difference by $f/2\pi$, where f is a frequency associated with the pyramid, and add the disparity residual to the initial disparity determination to produce a per-pyramid refined disparity estimate.

The pyramid reconstruction processor may be further configured to determine a new position of each pyramid to specify a displaced pyramid. The new position may be x+a·d, x being a location of the pyramid, d being a disparity of the pyramid and a being a constant. The pyramid reconstruction processor may be further configured to convert the displaced pyramid to be uniformly-spaced, using a non-uniform Fourier transform, and reconstruct a displaced one-dimensional scanline signal based on the displaced pyramid, using pyramid reconstruction.

In another aspect, the invention may be a non-transitory computer-readable medium with computer code instruction stored thereon, the computer code instructions, when executed by a processor, cause an apparatus to generate a disparity map for each of the left and right views of a received stereoscopic frame, and for each corresponding pair of left and right scanlines of the received stereoscopic frame, decompose the left and right scanlines into a left wavelet and a right wavelet, each of the wavelets being a sum of basis functions. The computer code instructions, when executed by a processor, may further cause the apparatus to establish an initial disparity correspondence between the left wavelet and the right wavelet based on the generated disparity maps, refine the initial disparity between the left wavelet and the right wavelet using a phase difference between the corresponding wavelets, and reconstruct at least one novel view based on the left and right wavelets.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

A description of example embodiments follows.

The teachings of all patents, published applications and references cited herein are incorporated by reference in their entirety.

The described embodiments provide an end-to-end solution for multi-view content creation that exploits complementary advantages of Lagrangian and Eulerian techniques and overcomes their limitations.

Lagrangian Techniques

Lagrangian techniques recover depth information first, and then use re-projection to create novel views. Using such an approach, prior work developed systems for real-time stereo-to-multi-view conversion, and similar techniques are used in the context of view reprojection for virtual reality. Although many sophisticated techniques for depth estimation have been proposed, this is still a challenging problem, especially in the case of real-time applications. The prior methods still suffer from low-quality depth maps, if the performance of the system is of high importance.

Figure 1A:
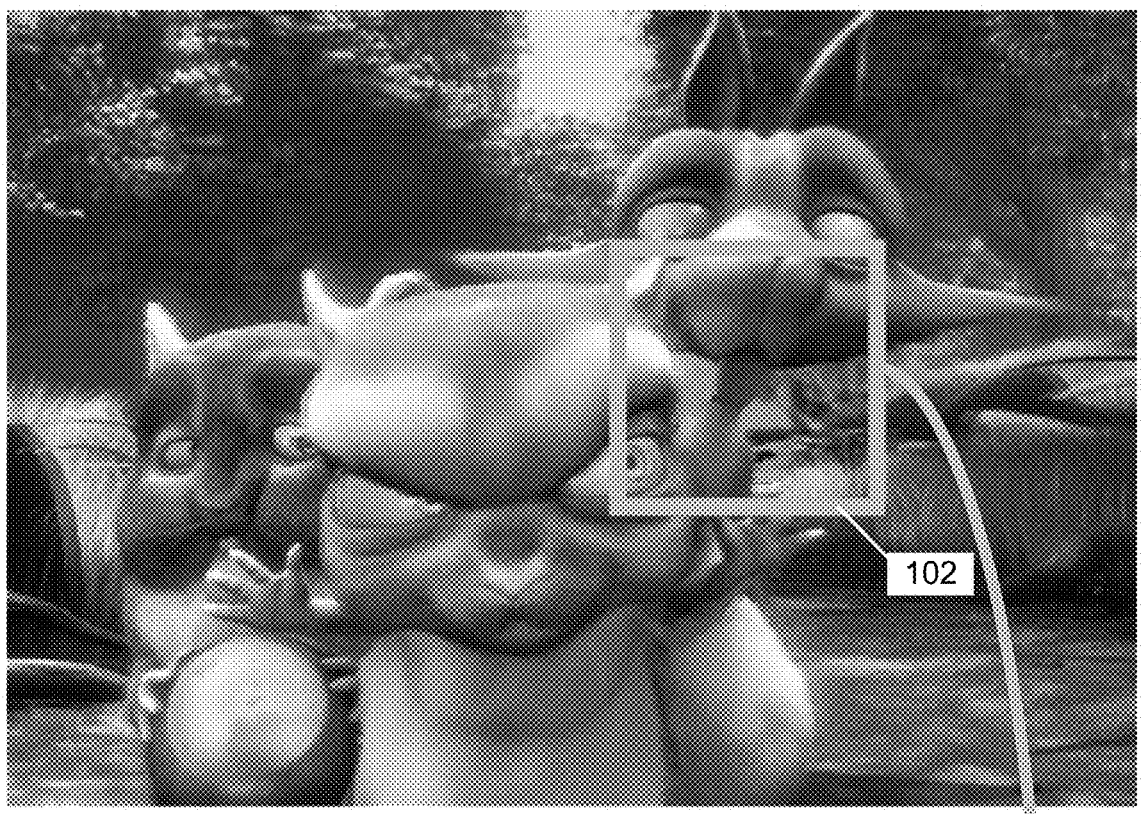
FIGS. 1A and 1B illustrate limitations of the Lagrangian approach.
Figure 1B:
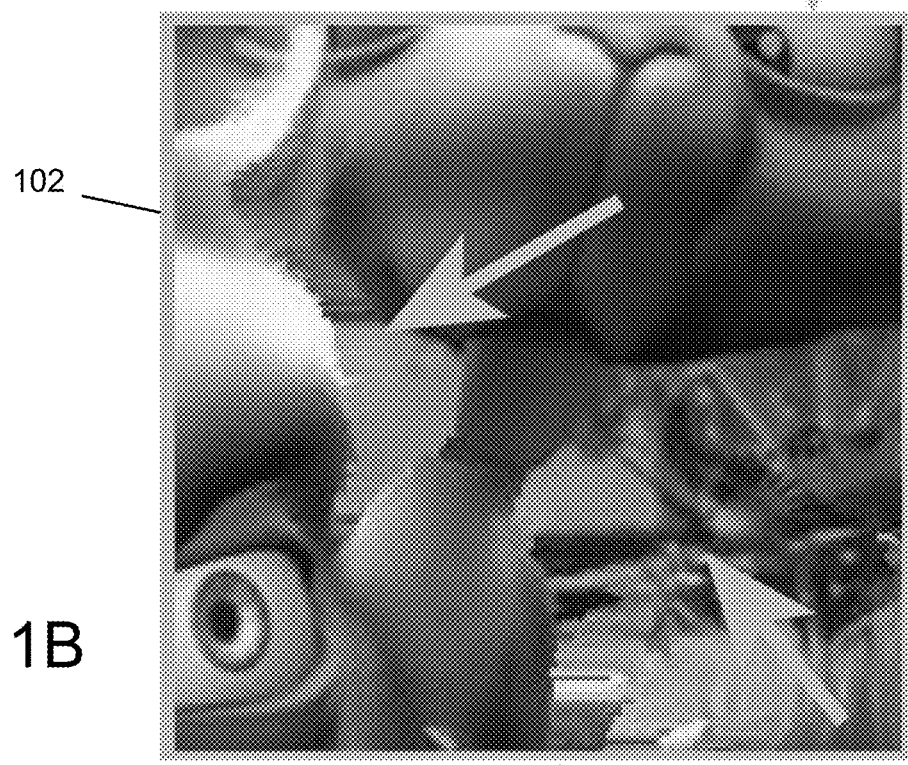

FIGS. 1A and 1B illustrate some of the aforementioned limitations of the Lagrangian approach. The inset 102 of FIG. 1A is shown in FIG. 1B. Arrows in FIG. 1B illustrate fuzzy depth edges resulting from conversions using the Lagrangian approach.

To overcome this limitation, it is possible to improve depth information using an additional filtering, or by applying more sophisticated matting techniques. Although such refinements can lead to significant quality improvement, this often comes at the price of reduced performance. For example, one prior solution requires an additional off-line preprocessing step. Another approach to overcome the problem of poor depth estimation is to use sparse depth information together with an image warping technique. Such methods have an additional advantage as they do not need to deal with missing information in disocclusion regions. This, however, comes at the price of poor depth quality at sharp depth discontinuities and in regions with one depth details. The resolution of the mesh is usually too coarse to handle such cases. Very recently, a hardware implementation of such a technique has also been presented. A different proposed approach involves training a deep convolution network for view interpolation. This approach trains a deep convolutional network for both disparity and in-between view computation for narrow baseline data. Both techniques achieve superior performance in challenging regions with occlusions, but they cannot perform significant extrapolation. It is also unclear how they can handle arbitrary baselines. Both aspects are crucial for creating content for automultiscopic display. Furthermore, real-time performance was not demonstrated for these techniques, especially in the context of high-resolution content.

Most of the Lagrangian approaches explicitly rely on per-pixel depth information. This is often insufficient when depth cannot be uniquely defined. Examples include motion blur, depth-of-field effects, and transparencies, which commonly appear in the case of movie content. This problem has been acknowledged by view synthesis techniques that handle the case of highly reflective surfaces. The most common techniques decompose the input image into layers, e.g., diffuse and specular, and perform the view synthesis separately for each of them. Although these techniques offer a significant step towards handling difficult cases, they deal only with reflections. Also, none of these works provide a complete real-time end-to-end system for novel view synthesis.

Eulerian Techniques

Eulerian techniques estimate local changes using local phase information, as opposed to recovering depth or optical flow information explicitly. Advantages of phase-based processing are often attributed to the overcomplete representation. Instead of one per-pixel depth value, phase-based approaches consider localized, per-band information. This leads to better results in difficult cases where per-pixel information cannot be reliably estimated (e.g., depth-of-field, motion blur, specularities, etc.), and more accurate estimates due to the sub-pixel precision of these techniques. Another argument is that phase-based manipulations are semi-local and cannot have catastrophic failures like pixel warping does. As a result, such methods provide graceful quality degradation.

Figure 2A:
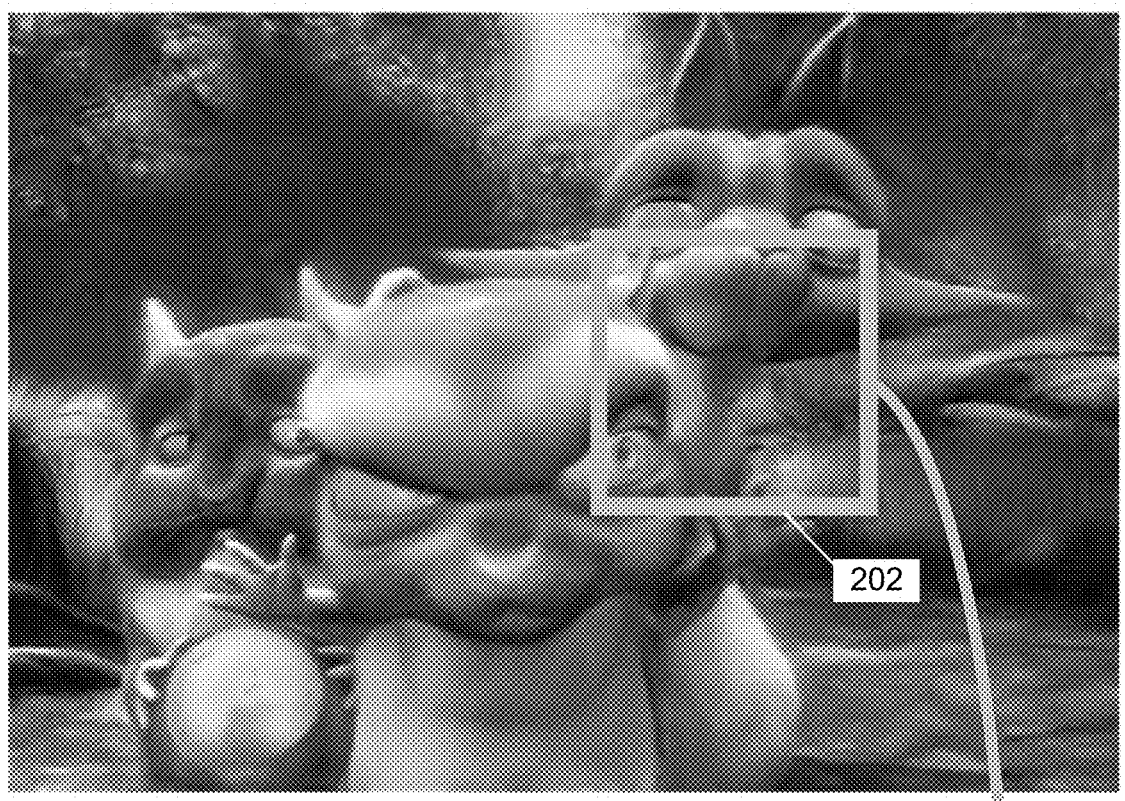
FIGS. 2A and 2B illustrate limitations of the Eulerian approach.
Figure 2B:
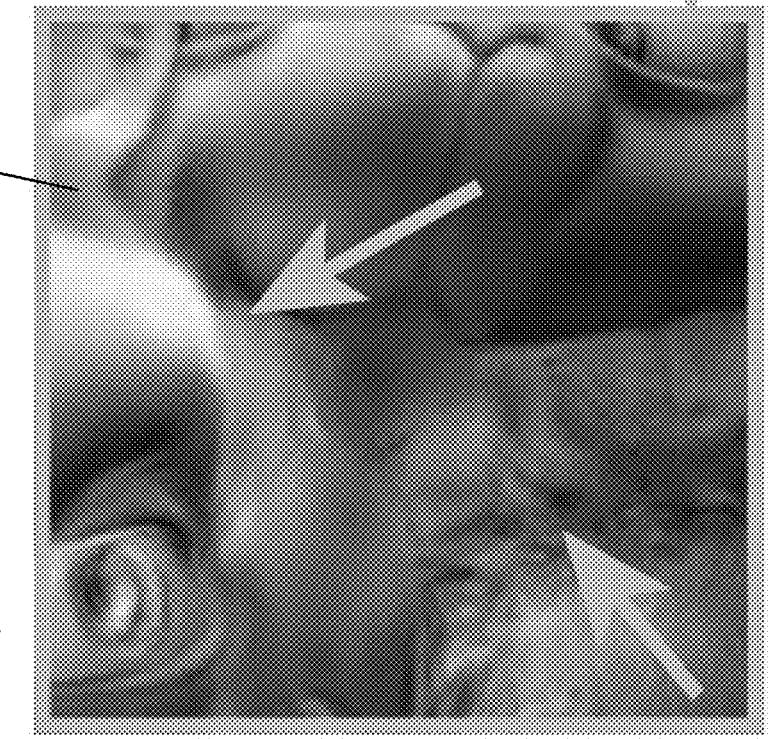

Unfortunately, phase-based techniques have one significant limitation: the disparity/depth range that they can deal with is relatively small. FIGS. 2A and 2B illustrate some of the aforementioned limitations of the Eulerian approach. The inset 202 of FIG. 2A is shown as FIG. 2B. Arrows in FIG. 2B illustrate ringing artifacts caused by exhaustive input disparities resulting from conversions using the Eulerian approach.

Although there exist multiscale phase-based disparity estimation techniques that extend the supported disparity range, the goal of such techniques is to estimate per-pixel disparity. Instead, the described embodiments of the invention address the problem of limited disparity support by combining a phase-based technique with a Lagrangian approach, which pre-aligns views to reduce disparity so that the Eulerian approach can be applied. One prior technique, known as view-synthesis, addresses the problem of reconstructing a light field from a micro-baseline image pair. The view-synthesis technique relies both on disparity and phase information. However, in contrast to the view-synthesis technique, which relies on per-pixel disparity information, the described embodiments use a concept of per-wavelet disparity, which provides much richer representation. Another difference is that the described embodiments a real-time solution capable of performing the stereo-to-multi-view conversion on the fly.

The described embodiments are based on a steerable pyramid decomposition, but augmented with depth information. This enables handling large disparities, which was the main limitation of previous phase-based methods. The described embodiments do not share disparity information between different frequency levels of our decomposition, as is the case with prior approaches working in the context of multi-scale approaches (also known as "coarse-to-fine propagation" techniques). Not sharing disparity information between different frequency levels leads to a more flexible representation for cases where a single per-pixel disparity is not defined, as for multiple depth-separated image layers. The described embodiments also reduce the conversion problem to a set of one dimensional (1D) problems, which significantly improves performance. To synthesize novel views, the described embodiments introduce a new view synthesis approach which re-projects wavelets. To this end, the described embodiments employ a non-uniform Fourier transform. Despite some similarities to the idea of pixel reprojection, the domain and technique are significantly different. All the above steps make the approach of the described embodiments suitable for hardware implementation, as described herein.

Figure 3A:
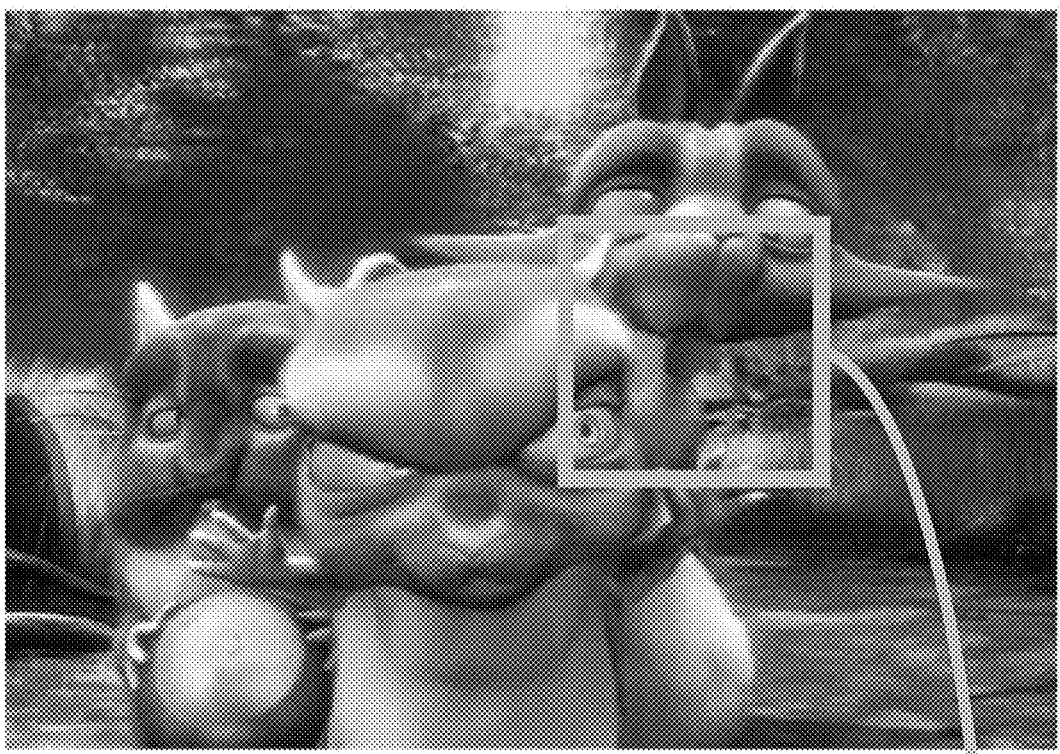
FIGS. 3A and 3B illustrate improvements with respect to the Lagrangian approach and the Eulerian approach shown in FIGS. 1A, 1B, 2A, and 2B.
Figure 3B:
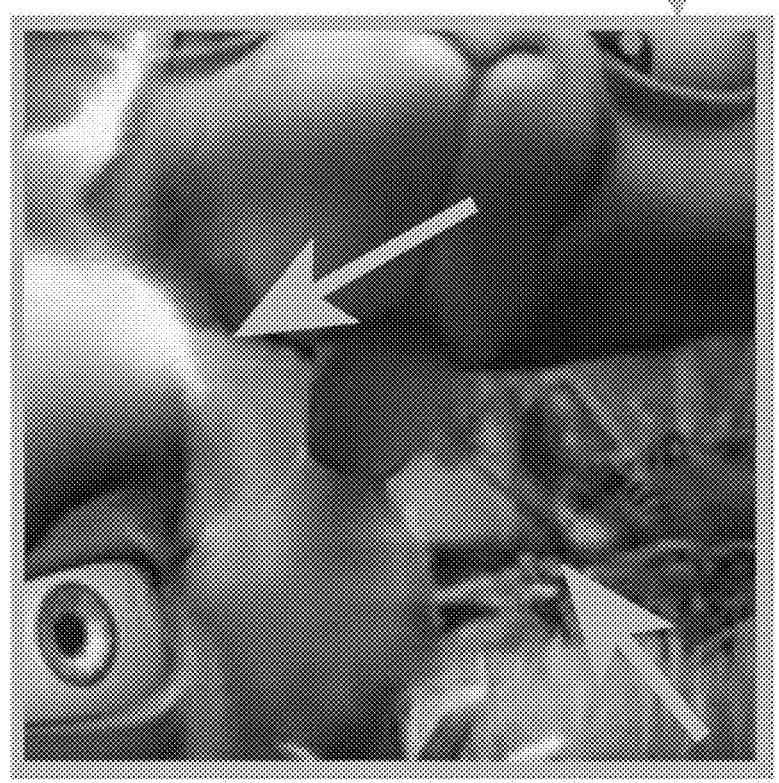
Figure 10A:
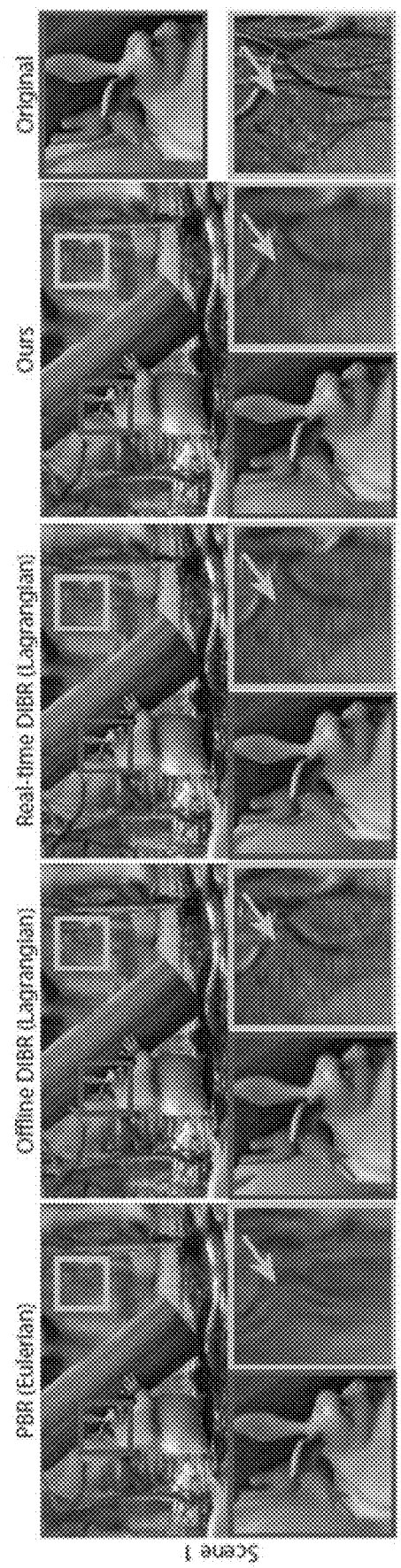
FIGS. 10A, 10B and 10C further illustrate improvements of the described embodiments with respect to the Lagrangian approach and the Eulerian approach
Figure 10B:
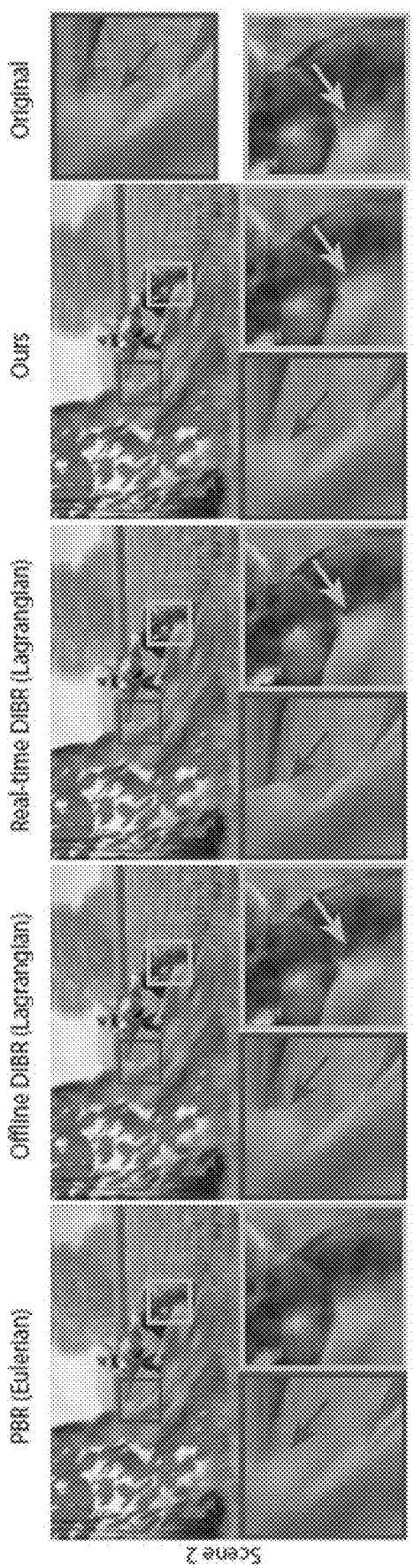
Figure 10C:
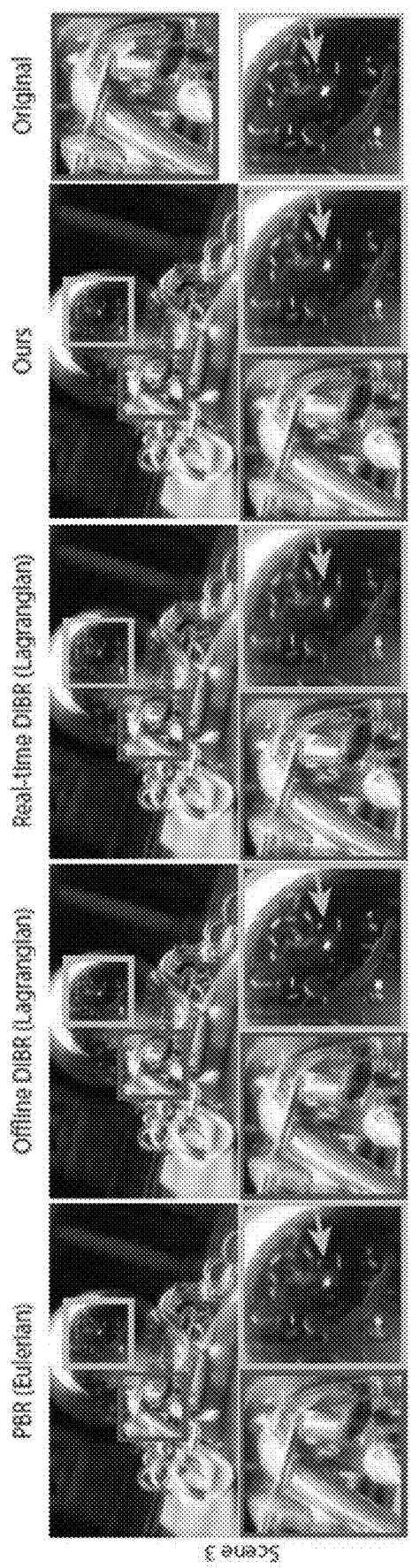

FIGS. 3A and 3B illustrate improvements resulting from the use of the described embodiments, with respect to the limitations shown in FIGS. 1A, 1B, 2A and 2B, of the Lagrangian and Eulerian approaches. The inset 302 of FIG. 3A is shown as FIG. 3B. Arrows in FIG. 3B illustrate improvements with respect to the Lagrangian and Eulerian approaches. FIGS. 10A, 10B, and 10C further illustrate improvements of the described embodiments with respect to the Lagrangian and Eulerian approaches.

Stereo to Multi-View Conversion

For expanding stereoscopic content to its multi-view version, the described embodiments take a rectified stereoscopic image pair as an input, together with corresponding disparity maps. The images are decomposed into wavelet representations, and disparity maps are used to determine per-wavelet disparity. While the example embodiments described herein utilize wavelet representations for image decomposition, one skilled in the art will recognize that other functions may alternatively be used as a basis for decomposition. For example, such functions may be specified through machine learning. There, the bases functions are described by learnable parameters which are predicted for each input stereoscopic pair by a network pre-trained to minimize perceived visual difference between the view synthesized using our method with given basis functions and the ground truth in a dataset of multiview images.

For efficiency reasons, the disparity maps may be of relatively low quality. The described embodiments are concerned with reproduction of horizontal parallax, and use low-resolution disparity maps (determined according to, e.g., *Fast cost-volume filtering for visual correspondence and beyond*, Asmaa Hosni, Christoph Rhemann, Michael Bleyer, Carsten Rother, and Margrit Gelautz, IEEE Trans. on Pattern Analysis and Machine Intelligence 35, 2 (2013), 504-511). The described embodiments may also rectify the input views (determined according to, e.g., *A compact algorithm for rectification of stereo pairs*, Andrea Fusiello, Emanuele Trucco, and Alessandro Verri, Machine Vision and Applications 12, 1 (2000), 16-22).

The described embodiments next refine per-wavelet disparity by incorporating phase information. To reconstruct novel views, the described embodiments implement an image-based rendering approach tailored to the decomposition. In contrast to standard image-based rendering techniques which use pixel reprojection to determine novel views, the technique of the embodiments re-projects whole wavelets. It supports both view interpolation and extrapolation in a unified way. The two operations differ only in the direction in which wavelet locations are altered.

Per-wavelet Depth Estimation

Disparity is an important cue to synthesize novel views. For stereoscopic content, disparity maps ($D_l$ and $D_r$) encode the correspondence between left and right views (L and R). More formally, if for a given position in the world space, its projections into the left and the right views are $x_l$ and $x_r$, the disparity is defined as the distance between those locations in the screen space. A signed distance is considered to distinguish between locations in front of and behind the zero-disparity plane. For rectified views disparity maps represent a horizontal translation and can be defined as follows: $D_l(x_l)=x_{lx}-x_{rx}$ and $D_r(x_r)=x_{rx}-x_{lx}$, where $x_{lx}$ and $x_{rx}$ denote the horizontal components of $x_l$ and $x_r$.

In contrast to previous approaches, the described embodiments consider per-wavelet, instead of per-pixel, disparity. This allows the use of phase information to improve the quality of the estimates and overcome limitations of previous Lagrangian and Eulerian approaches. To determine per-wavelet disparities, the input images are first decomposed into wavelet representations. Then, for each wavelet, the initial disparity is determined from the input disparity maps. In the next step, this information is refined by additionally considering local phase information.

Figure 4A:
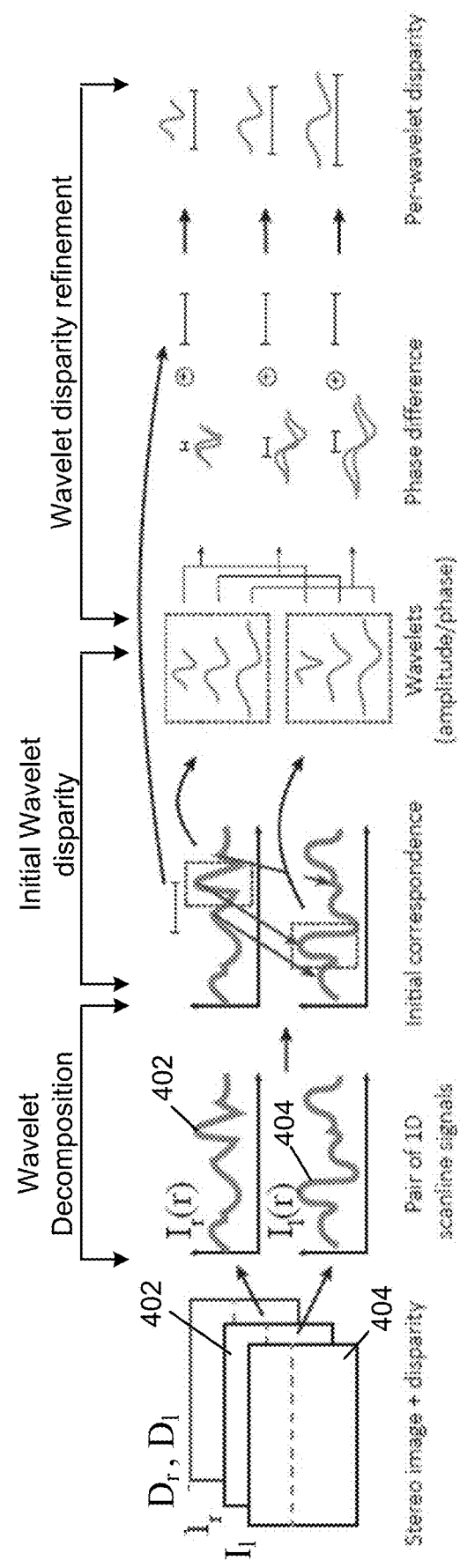
FIGS. 4A and 4B illustrate the entire stereoscopic to three-dimensional conversion process according to the invention.
Figure 4B:
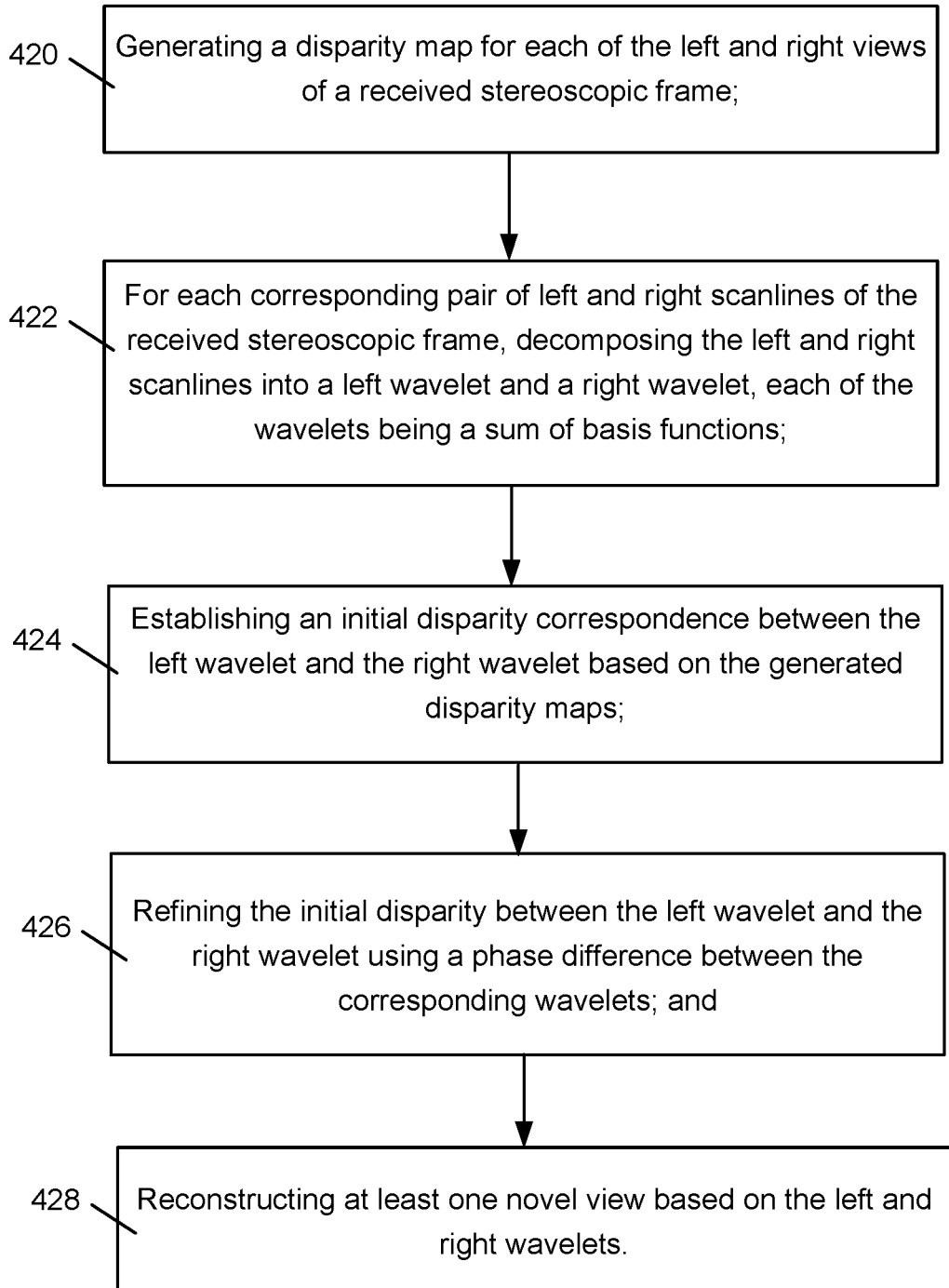

An example embodiment, depicted in FIGS. 4A and 4B, demonstrates the entire stereoscopic to multiview conversion process. The process is depicted graphically in FIG. 4A, and as a flow diagram in FIG. 4B. In contrast to most approaches where a per-pixel disparity is estimated, the example embodiments described herein consider wavelets as basic elements of a picture and estimate disparity for each of them. As set forth herein, however, functions other than wavelets may alternatively be used.

As shown in FIG. 4A, a stereoscopic image pair $I_l$ and $I_r$ is received, and each image scanline 402, 404 is considered independently. The scanlines are decomposed into wavelets and the initial correspondence between wavelets is found, from the left and the right views, based on the input disparity maps $D_l$ and $D_r$. The position difference of the corresponding wavelets defines the initial disparity information. To further refine it, the phase difference of the wavelets is computed and combined with the initial disparity estimation. The disparity information is not a single disparity map. Instead, one disparity map is obtained for each pyramid level.

FIG. 4B depicts an example method of converting stereo video content to multi-view video content, according to the invention. The process may comprise generating 420 a disparity map for each of the left and right views of a received stereoscopic frame. For each corresponding pair of left and right scanlines of the received stereoscopic frame, the process further comprises decomposing 422 the left and right scanlines into a left sum of wavelets or other basis functions, and a right sum of wavelets or other basis functions. The process may further comprise establishing 424 an initial disparity correspondence between the left wavelets and the right wavelets based on the generated disparity maps, refining 426 the initial disparity between the left wavelet and the right wavelet using a phase difference between the corresponding wavelets, and reconstructing 428 at least one novel view based on the left and right wavelets.

Wavelet Decomposition.

Because the input views are rectified, the analysis may be limited to scanlines. Each pair of corresponding scanlines (1D signals, $I_r$ 402 and $I_l$ 404) of the right and left views are considered separately and are represented as a sum of basis functions $b_f$ with a frequency response defined as:

$$\hat{b}_f(\xi) = \cos\left(\frac{\pi}{2}\log_w(\xi/f)\right) \cdot \Pi\left(\frac{1}{2}\log_w(\xi/f)\right) \quad (1)$$

where f∈$\mathcal{F}$ specifies the central frequency of the filter, Π is a rectangular function centered around zero that extends from −0.5 to 0.5, and w defines the width of filters, i.e., the ratio of central frequencies of neighboring levels. An example embodiment performs an octave decomposition that uses w=2. No visible difference was found when reconstructing new views using $\mathcal{F}$ with a frequency below 16. Consequently, the described embodiments use $$\mathcal{F} = \{2^n | n = \{4 \ldots \log_2(\text{length}(l))\}\}.$$

Figure 5:
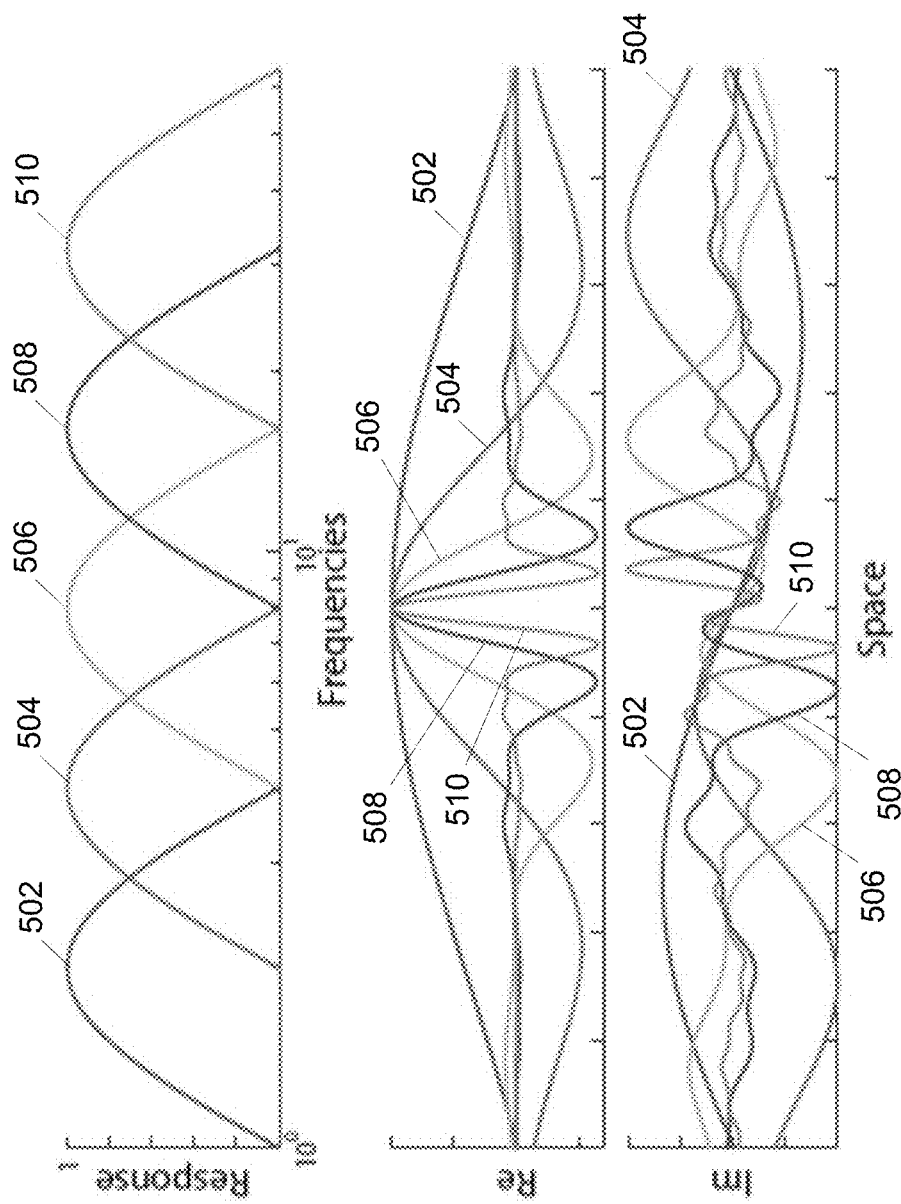
FIG. 5 illustrates visualizations of the filters of the described embodiments used to perform wavelet decomposition.

The filters in Equation (1) are 1D filters (which may be determined based on, e.g., *The steerable pyramid: A flexible architecture for multi-scale derivative computation*, Eero P Simoncelli and William T Freeman, In Image Processing, International Conference on, Vol. 3. IEEE Computer Society, 3444-3444 (1995)). The filters of the example embodiments allow for computing local phase and amplitude, but lack information on orientation. An additional low-pass filter, $$\hat{b}_0(\xi) \, \Pi_{f \in \mathcal{F}} \sqrt{1 - \hat{b}_f^2(\xi)} \quad (2)$$

collects the residual low-frequency components. The filters of the example embodiment, used to perform wavelet decomposition, are visualized in FIG. 5. The top graph shows the frequency response for several filters 502, 504, 506, 508, 510. The middle graph shows the real part in the spatial domain, and the bottom graph shows the imaginary part in the spatial domain. The plots in the spatial domain are scaled for visualization purposes.

Using such a filter bank, the described embodiments may determine a single wavelet coefficient for a given location x and frequency f as:

$$A_{fx} = (b_f * I)(x),$$

where * denotes a convolution. Since $b_f$ is a complex filter, $A_{fx}$ is a complex number which contains local phase and amplitude. The decomposition can be easily inverted by summing up wavelets for all frequencies in ($\mathcal{F}$) and the additional residual component from Equation (2), as follows:

$$I = 2\text{Re}\left(\sum_{f \in \mathcal{F} \cup \{0\}} \int^x \frac{\text{length}(I)}{|X_f|} \left(\sum_{x \in X_f} \hat{A}_{fx} b_f(t - x)\right)\right). \quad (3)$$

The additional factor of two compensates for the fact that the complex wavelets are obtained only from positive frequency components, and factor of length(I)/|$X_f$| is necessary to compensate for the energy loss due to only |$X_f$| wavelets representing the signal. The described embodiments may use $$X_f = \{x \in \mathbb{Z} \mid \max(f - f/2, 1) \leq x \leq \min(f + f + f/2, \text{length}(I))\}$$

for f∈$\mathcal{F}$ and $X_0 = x_{fmin}$ where fmin is the lowest frequency in $\mathcal{F}$. These sets have overlapping regions such that each wavelet is sampling at least twice, which prevents aliasing. In the described embodiments, both decomposition and reconstruction are performed in the frequency domain. To decompose the signal, each 1D scanline is transformed into the frequency domain, multiplied with the filters, and the result is transformed to the pixel domain. The reconstruction is done similarly in the frequency domain, but this step requires a non-uniform Fourier transform.

Initial Wavelet Disparity.

After decomposing $I_r$ and $I_l$ into wavelets, the described embodiments establish a correspondence between $I_r$ and $I_l$ using input disparity maps ($D_r$ and $D_l$). More precisely, for each wavelet $\psi_{rfx}$ from $I_r$ a corresponding wavelet $\psi_{lfx'}$ is sought from $I_l$. To this end, for each $\psi_{rfx}$ a disparity value is determined from $D_r$. Because each wavelet spans a certain spatial extent, there is no direct correspondence between wavelets and disparity values. Therefore, the disparity of a wavelet is determined as an average of disparities in its local neighborhood whose size is equal to the wavelet spacing. Formally, the disparity for wavelet $\psi_{rfx}$ is defined as $$d_{rfx} = \sum_{y=x-s/2}^{x+s/2} \int^x |D_r(y)/(s+1), \text{ where } s = |I_r|/|X_f|.$$

The wavelet $\psi_{lfx'}$ is then found as the closest wavelet to the location x−$d_{rfx}$. This step is performed repeatedly for all wavelets from $I_l$. In an alternative embodiment, the closest wavelet may be found by re-evaluating it at the exact same location. Such an embodiment, however, may significantly increase the computational cost.

Wavelet Disparity Refinement.

The disparity between wavelet pairs determined in the previous step (initial wavelet disparity) is often inaccurate, due to insufficient quality of the input disparity maps, or additional effects such as transparency or depth of field that cannot be captured using a per-pixel disparity value. The initial correspondence, however, serves as a good pre-alignment, and the residual disparity that is not captured by the disparity is usually small. Such small, often sub-pixel differences can usually be effectively captured by the phase. Therefore, the per-wavelet disparity estimation may be further improved using phase difference between corresponding wavelets:

$$\Delta\varphi = \arg(A_{rfx}) - \arg(A_{lfx'}).$$

The phase difference can be easily transformed into the disparity residual by multiplying it by f/2π and added to the initial disparity of wavelet as a correction. Consequently, the disparity information $d_{rfx}$ of wavelet $\psi_{rfx}$ is updated by adding Δφ·f/2π. In this way, a continuous depth resolution may be obtained without expensively numerous depth labels. For color images, phase differences may be determined for each channel separately and combine them using a weighted sum to get the disparity refinement. The weights are proportional to the wavelet amplitudes to penalize the phase for weak signals that can be only poorly estimated.

The per-wavelet disparity estimation is performed on individual 1D scanlines. To prevent inconsistencies between the scanlines, an additional filtering is applied to the disparity estimation. More precisely, the per-wavelet disparity is filtered using a 2D mean filter with a kernel size equal to double wavelet spacing. To avoid filtering across significant discontinuities, contributions from wavelets are penalized with a large phase difference. To this end, the contribution of each wavelet for this example embodiment is weighted using a Gaussian function defined on the phase differences with σ=π/4.

An accurate disparity estimation for each wavelet is determined as a result of the wavelet disparity refinement step. Compared to standard depth-based techniques that determine per-pixel disparity information, the example embodiment provide a much richer representation, as it stores disparity information separately for different frequencies. Such additional information enables handling difficult cases when used for rendering novel views.

Novel Views Reconstruction

To determine novel views, the example embodiment modifies the position of each wavelet. The new position for each wavelet ψ, at location x and disparity d, is determined as x+a·d, where parameter a directly controls the new viewing position. After the position of each wavelet is updated, the displaced wavelets are converted back into uniform-spaced samples using a non-uniform Fourier transform. The non-uniform Fourier transform process utilizes an oversampled grid with an oversampling factor m=2. Each displaced wavelet is approximated as a weighted sum of q=4 nearby samples on the oversampled grid, where the weights depend on the fractional residual in the displaced location. After the contributions from all wavelets are summed, a low-pass filter is used to downsample back into the original grid. After the wavelets are converted back to the original uniform grid, the 1D signal may be reconstructed using a pyramid reconstruction. For lowest frequency wavelets corresponding to filter $b_0$, a linear interpolation of the wavelet values on the uniform grid is used, to prevent low-passed wavelets from accumulating and creating color bands.

View Arrangement for a Screen

In the simplest case, the two input views are treated as the central views of an autostereoscopic screen, and reconstructed every other view from the closest original one. More formally, if the targeted display requires a set of 2N views $\{V_i\}$, then $v_N$ view corresponds to the left input view, and $V_{N+1}$ view corresponds to the right input view. The set of views $\{v_i : i<N\}$ is then reconstructed from the left view by setting $a=|i-N-1|$. This strategy leads to a simple view expansion. Note that before reconstructing novel views, the pair of corresponding wavelets from the left and the right views can be moved closer to each other by scaling disparity between them by factor $s<1$ and moving their positions accordingly. Effectively, such an operation reduces disparities in the original views, and when the strategy for new views reconstruction is applied, the disparities between neighboring views will be compressed by factor s. Similarly, one can increase disparity in the multi-view content by scaling the disparities between the initial wavelets by $s>1$. Please note that if $s<1$, some of the views will be a result of interpolation between the input views, and others will be extrapolated. The example embodiment is, however, transparent to these cases and can treat both of them simultaneously.

Occlusions and Disocclusions

Moving individual wavelets of the same frequency independently has similar shortcomings as moving image patches in the Lagrangian approach, e.g., there might be two potential problems resulting from the non-uniform sampling. First, there can be missing information in the undersampled regions. This does not cause significant problems, as there is remaining information in lower frequency levels. Second, some of the wavelets may overlap. This leads to mixing background and foreground signals. To avoid this, the example embodiment detects occluded wavelets and attenuates their frequency. This approach is conceptually similar to resolving pixel occlusions using depth information in depth-image-based rendering (DIBR).

Figure 6:
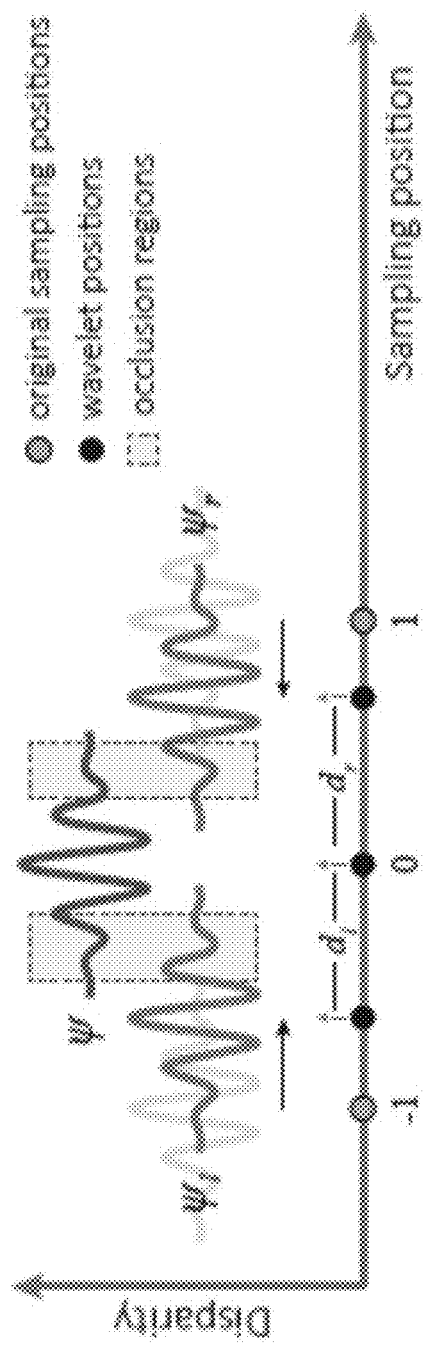
FIG. 6 illustrates resolving occlusion of wavelets according to the invention.

To this end, for a given wavelet $\psi$ the example embodiment first finds the closest wavelets to the left $\psi_l$ and to the right $\psi_r$ that have smaller disparities (i.e., they are in front of $\psi$). It is sufficient to consider wavelets corresponding to the same frequency. The portion of the wavelet $\psi$ that is occluded by $\psi_l$ and $\psi_r$ is then determined. An assumption is made that one wavelet completely occludes the other wavelet if the distance between them is at most half of the original sampling distance. As a result, the occlusion is defined using distances between sampling locations of $\psi$ and the other two wavelets, i.e., the occlusion caused by $\psi_l$ is defined as $O_l = \max(2-2d_l, 0)$ and for $\psi_r$ by $O_r = \max(2-2d_r, 0)$. Here, $d_l$ and $d_r$ are the distances, as marked in FIG. 6, and the original spacing between wavelets is assumed to be 1. The occlusions have constant value 1 if the neighboring wavelet moves halfway to $\psi$, and 0, if the distance between them is at least the original sampling distance. To combine occlusions for both wavelets, we define the effective occlusion of wavelet $\psi$ as $O_\psi = O_l + O_r \cdot O_\psi = 0$ indicates that neither $\psi_l$ nor $\psi_r$ occlude $\psi$. $O_\psi = 1$ indicates that wavelet $\psi$ is completely occluded. Next, the wavelet $\psi$ is attenuated according to a smooth function $s(x)$ that interpolates between 0 and 1, i.e., $$s(x) = \begin{cases} 1 & \text{if } x \geq 1 \\ 3x^2 - 2x^3 & \text{if } x \in (0, 1) \\ 0 & \text{if } x \leq 0 \end{cases}$$

The amplitude of the attenuated wavelet is then defined as $\overline{A}_\psi = s(O_\psi) \cdot A_\psi$. For real-time performance, we find $\psi_l$ and $\psi_r$ by first placing all wavelets in buckets according to their location, and then considering wavelets only from neighboring buckets within a distance of the wavelet spacing at the current level.

Additional Processing

Computing high-quality views is not sufficient to assure perfect viewing quality. Due to the limited angular resolution of automultiscopic screens, displaying synthesized multi-view content directly on a screen may lead to significant inter-view aliasing in regions with large disparities and fine texture. One of the results of such aliasing is ghosting (see, e.g., FIG. 7, insets 702, 704). Images in FIG. 7 labeled as "modified" represent results of processing according to the described embodiments. To enhance the quality and provide a better experience, an inter-view antialiasing may be applied. Moreover, due to the accommodation-vergence conflict, large disparities may introduce visual discomfort. To overcome this limitation, depth presented on such an automultiscopic display needs to be carefully adjusted to match its capabilities. Both angular antialiasing and depth manipulations can be easily incorporated into our method.

Antialiasing

One technique for performing inter-view antialiasing is by attenuating local amplitude according to phase information. To filter a view that was synthesized using our method, we attenuate every wavelet before the view is reconstructed. The amount of attenuation depends directly on the disparities between neighboring views, which can be easily obtained from our representation. The example embodiment implements Gaussian filter for antialiasing filtering. For a given wavelet at frequency level f with disparity d, the signal is filtered with $$\frac{1}{\sqrt{2\pi}\sigma} \exp(-d^2/(2\sigma^2)),$$

where $\sigma$ is the antialiasing width. This corresponds to multiplying amplitude of each wavelet by $$\exp\left(-\sigma^2 \left(\frac{2\pi d}{f}\right)^2 / 2\right).$$

Figure 7:
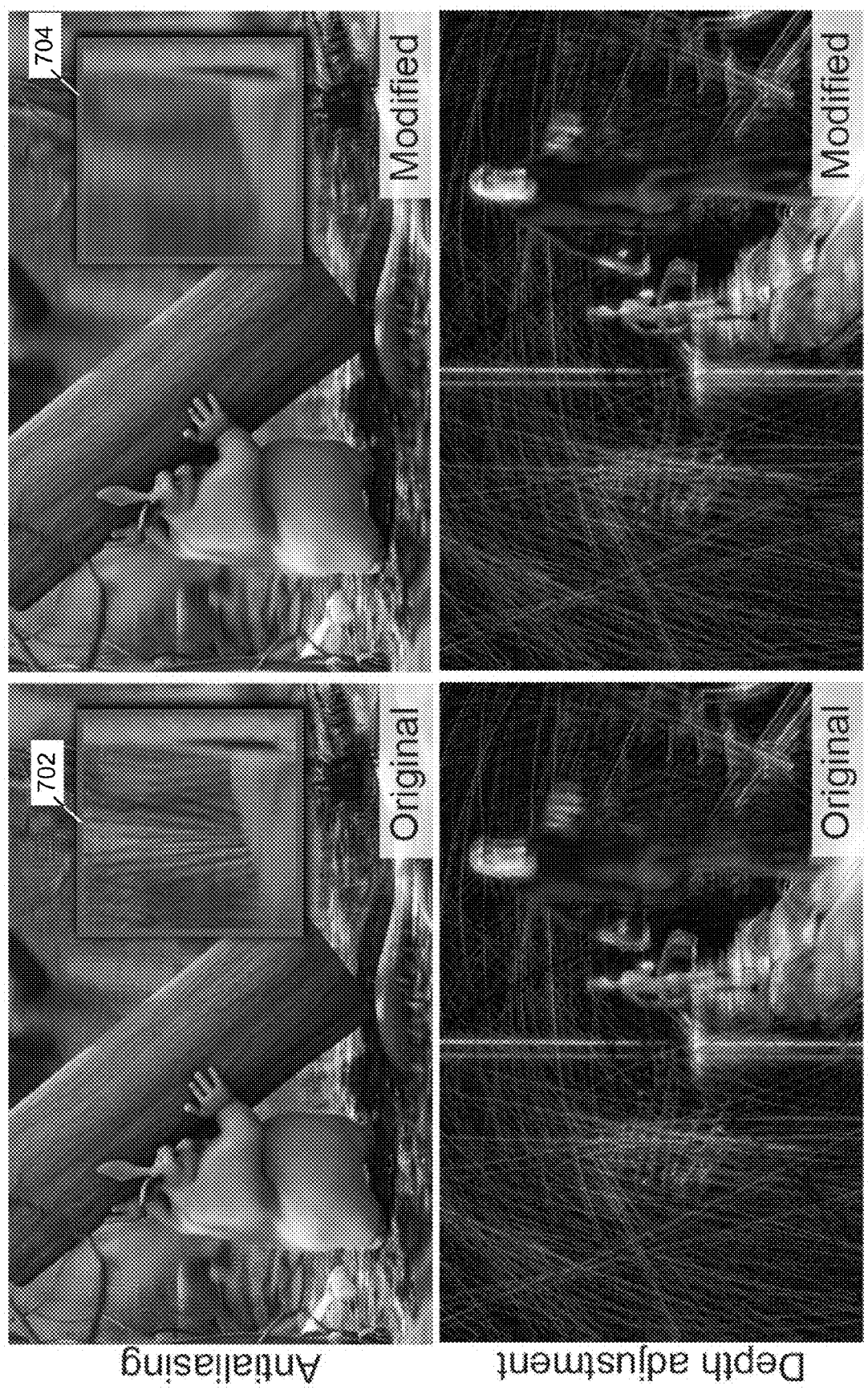
FIG. 7 illustrates antialiasing and disparity adjustment facilitated by the described embodiments.

The example of a synthesized view and its filtered version is shown in FIG. 7 (top). Note that this filtering can lead to blur in areas with large disparities, e.g., the background. But in return, such filtering avoids significant ghosting, which can impair stereo perception and is generally undesirable.

Disparity Adjustment

Using the wavelet representation of the described embodiments, together with per-wavelet disparity information, w non-linear disparity mapping operators may be easily applied, which was not possible for Eulerian methods. Such operators are usually defined as a disparity mapping function that maps disparity according to certain goals. In contrast to simple disparity scaling, a disparity mapping function usually scales disparities in a non-linear way. To apply such a mapping during the synthesis, it is sufficient to replace the scaling factor s with the desired non-linear function. The rest of the described view synthesis technique remains unchanged. FIG. 7 (bottom) demonstrates one example of such manipulations.

FIG. 7 presents results of the additional processing described herein. The top portion of FIG. 7 shows a synthesized view using the technique of the described embodiments (left) without inter-view antialiasing simulated as it would appear on an automultiscopic screen. The top-right portion of FIG. 7 shows the same view with the antialiasing, and the inset shows a zoomed-in region. Note how aliasing in the form of ghosting is removed by the additional step. The bottom portion of FIG. 7 shows an example of nonlinear disparity remapping. The depth for the foreground objects is compressed, resulting in this part of the scene being pushed close to the zero disparity plane (screen depth).

Implementations

The described embodiments facilitate performance that is necessary to convert a 4K stereoscopic content in real time. Two example embodiments are presented—a CUDA-based GPU implementation, and a hardware implementation using an FPGA with ARM processors. CUDA is a parallel computing platform and application programming interface known in the art.

GPU Implementation

The example embodiment produces content for an 8-view 4K (3840×2160) automultiscopic display, where each of the output views has a resolution of 960×1080. The example embodiment accepts a FullHD stereo video input and determines the initial disparity maps at a quarter the size of the input. The rest of the pipeline is determined at 960×1080. The example embodiment implements the processing described herein on a GPU using CUDA. The example embodiment runs on the Nvidia GeForce GTX Titan Z graphics card. For such a setup, the described embodiments can perform the conversion with the additional steps in 25-26 FPS for all sequences presented herein. The breakdown of the timing and the memory usage for the individual steps is presented in Table 1.

TABLE 1

| Stage | Timing (%) | Memory (GB) |
|---|---|---|
| Pyramid decomposition | 9.9 | 1.05 |
| Initial disparity estimation | 4.9 | 0.31 |
| Per-wavelet disparity refinement | 18.5 | 0.23 |
| Wavelet re-projection | 30.5 | 0.50 |
| Pyramid reconstruction | 36.2 | 1.55 |

GPU Implementation

One advantage of the described embodiments is that most stages in the processing can be done in a scanline fashion. This eliminates the need for any external memory during the computation of these stages, and thus, it is suitable for a hardware implementation such as an field programmable gate array (FPGA) or an application-specific integrated circuit (ASIC). The described embodiments require only low-resolution disparity maps. Therefore, the described embodiments leverage the ARM processors inside the System-On-Chip (SoC) for this task. The ARM processor determines these disparity maps at the 240×180 resolution at 24 FPS.

Figure 8:
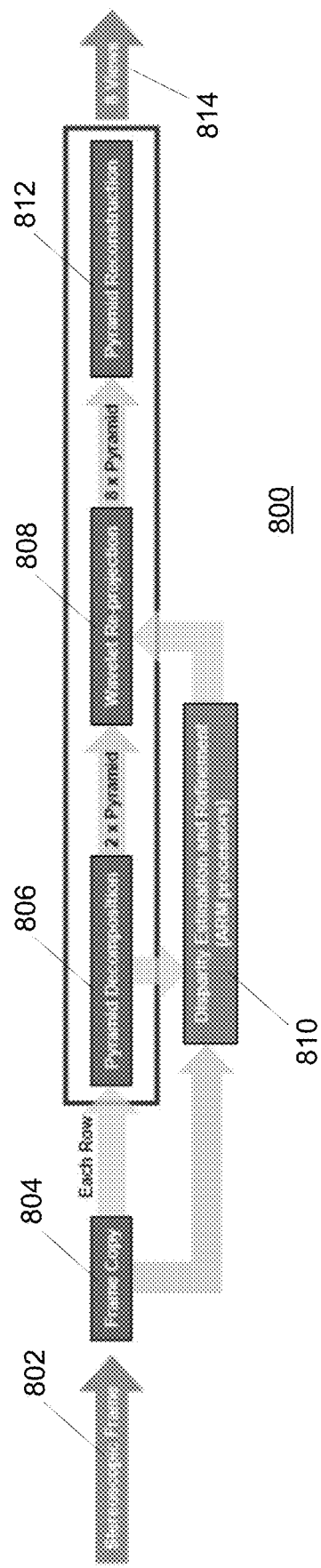
FIG. 8 depicts each stage in an example embodiment hardware implementation 800 of the described embodiments.

FIG. 8 depicts each stage in an example embodiment hardware implementation 800 of the described embodiments. A steroscopic frame 802 is received by a frame copy block 804, which produces two copies of the stereoscopic frame 802. A pyramid decomposition block 806 decomposes the frame into two pyramids: a first pyramid for the left view and a second pyramid for the right view. Both pyramids are sent to a wavelet reprojection block 808, in which each wavelet in the pyramid is re-projected according to the disparity maps generated by the ARM processor 810 (which performs disparity estimation and refinement). The re-projected wavelets are filtered similarly to the filtering described in *An accurate algorithm for nonuniform fast Fourier transforms (NUFFT's)*, Q H Liu and N Nguyen, IEEE Microwave and Guided Wave Letters 8, 1 (1998), 18-20, Lytro Inc., January 2015, https://www.lytro.com/, and sent to pyramid reconstruction block 812. This final stage 812 reconstructs views from the synthesized pyramids, and sends the resulting novel views (eight views in this example embodiment) to the output 814.

The example embodiment was implemented on an FPGA SoC Xilinx ZC706 development board using Xilinx Vivado HLS 2015.4 software. The FPGA SoC has two ARM processors running at up to 1 GHz and programmable logic with 350K logic cells and a total of 19 Mbit of internal RAM. Table 2 shows the resource utilization of our implementation. Each stage is customized to the target, generating 8 views of 512×540 resolution at 24 FPS while running at 150 MHz. The total memory utilization of our implementation is only 13 Mbit of the internal memory. The example embodiment uses only about 50% of the hardware resource on the FPGA. The resolution may therefore be doubled to get a FullHD resolution.

TABLE 2

| Stage | RAMs (Kbits) | DSPs | LUTs | FFs |
|---|---|---|---|---|
| Pyramid decomposition | 976 | 26 | 14K | 12K |
| Wavelet re-projection | 12,960 | 427 | 74K | 85K |
| Pyramid reconstruction | 1,476 | 75 | 13K | 20K |

Figure 9:
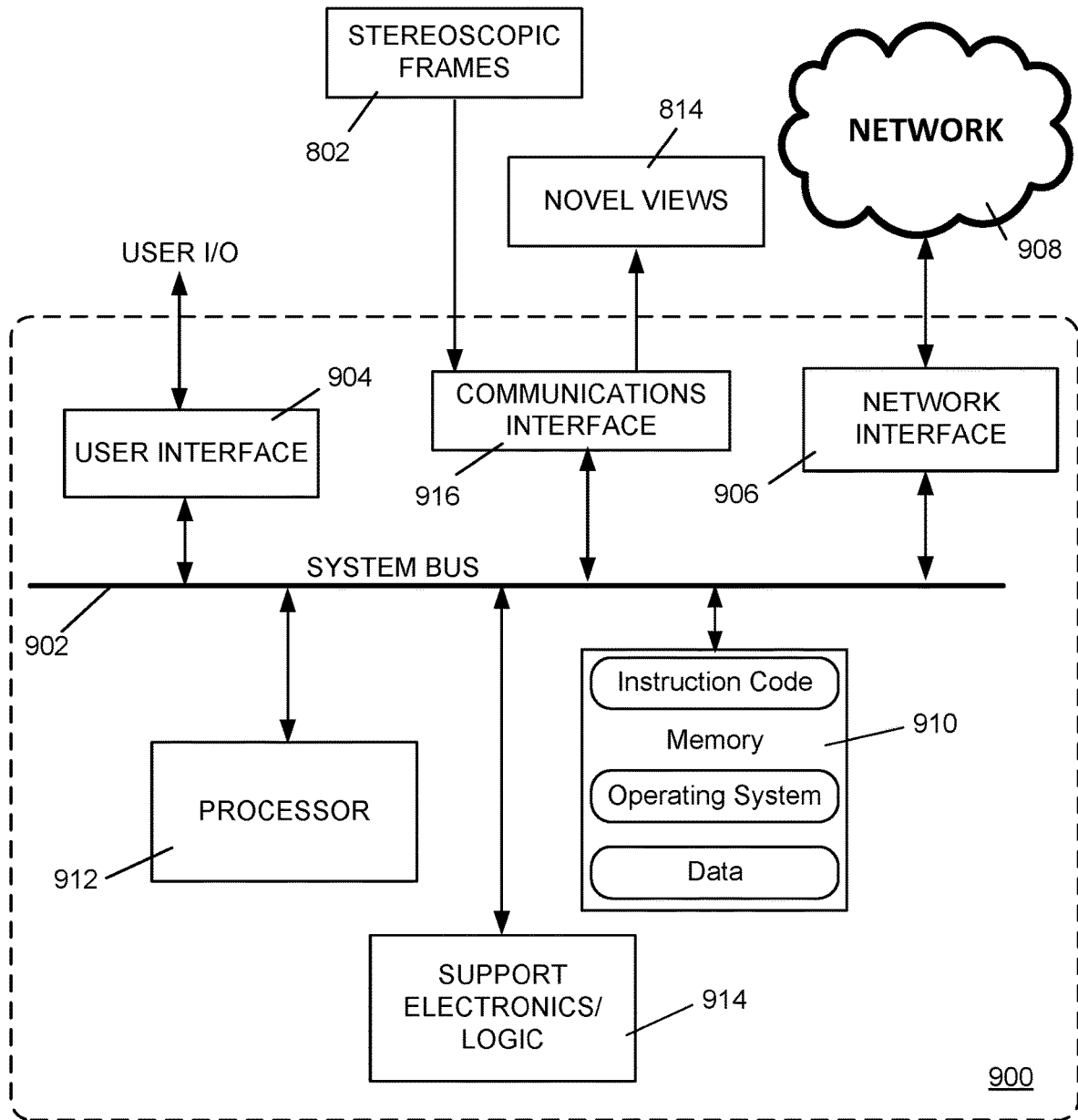
FIG. 9 shows a diagram of an example internal structure of a processing system 900 that may be used to implement one or more of the embodiments herein.

FIG. 9 is a diagram of an example internal structure of a processing system 900 that may be used to implement one or more of the embodiments herein. Each processing system 900 contains a system bus 902, where a bus is a set of hardware lines used for data transfer among the components of a computer or processing system. The system bus 902 is essentially a shared conduit that connects different components of a processing system (e.g., processor, disk storage, memory, input/output ports, network ports, etc.) that enables the transfer of information between the components.

Attached to the system bus 902 is a user I/O device interface 904 for connecting various input and output devices (e.g., keyboard, mouse, displays, printers, speakers, etc.) to the processing system 900. A network interface 906 allows the computer to connect to various other devices attached to a network 908. Memory 910 provides volatile and non-volatile storage for information such as computer software instructions used to implement one or more of the embodiments of the present invention described herein, for data generated internally and for data received from sources external to the processing system 900.

A central processor unit 912 is also attached to the system bus 902 and provides for the execution of computer instructions stored in memory 910. The system may also include support electronics/logic 914, and a communications interface 916. The communications interface may comprise, for example, a port for receiving the stereoscopic frames 802 and outputting novel views 814, as described in FIG. 8.

In one embodiment, the information stored in memory 910 may comprise a computer program product, such that the memory 910 may comprise a non-transitory computer-readable medium (e.g., a removable storage medium such as one or more DVD-ROM's, CD-ROM's, diskettes, tapes, etc.) that provides at least a portion of the software instructions for the invention system. The computer program product can be installed by any suitable software installation procedure, as is well known in the art. In another embodiment, at least a portion of the software instructions may also be downloaded over a cable communication and/or wireless connection.

It will be apparent that one or more embodiments described herein may be implemented in many different forms of software and hardware. Software code and/or specialized hardware used to implement embodiments described herein is not limiting of the embodiments of the invention described herein. Thus, the operation and behavior of embodiments are described without reference to specific software code and/or specialized hardware—it being understood that one would be able to design software and/or hardware to implement the embodiments based on the description herein.

Further, certain embodiments of the example embodiments described herein may be implemented as logic that performs one or more functions. This logic may be hardware-based, software-based, or a combination of hardware-based and software-based. Some or all of the logic may be stored on one or more tangible, non-transitory, computer-readable storage media and may include computer-executable instructions that may be executed by a controller or processor. The computer-executable instructions may include instructions that implement one or more embodiments of the invention. The tangible, non-transitory, computer-readable storage media may be volatile or non-volatile and may include, for example, flash memories, dynamic memories, removable disks, and non-removable disks.

While example embodiments have been particularly shown and described, it will be understood by those skilled in the art that various changes in form and details may be made therein without departing from the scope of the embodiments encompassed by the appended claims.

What is claimed is:

1. A method of converting stereo video content to multi-view video content, comprising:
    combining an Eulerian approach with a Lagrangian approach by:
        decomposing a stereoscopic input using a set of basis functions to produce a set of decomposed signals of one or more frequencies;
        estimating disparity information for each of the decomposed signals; and
        synthesizing novel views by re-projecting the decomposed signals, the re-projecting comprising moving the decomposed signals according to the disparity information.

2. The method of claim 1, wherein the decomposed signals are a sum of basis functions of the form $$\hat{b}_f(\xi) = \cos\left(\frac{\pi}{2}\log_w(\xi/f)\right) \cdot \Pi\left(\frac{1}{2}\log_w(\xi/f)\right).$$

3. The method of claim 1, further comprising:
    generating a disparity map for each of a left view and a right view of the stereoscopic input; and
    establishing an initial disparity correspondence, between each of a corresponding set of left and right decomposed signals, based on the generated disparity maps.

4. A method of converting stereo video content to multi-view video content, comprising:
    generating a disparity map for each of the left and right views of a received stereoscopic frame;
    for each corresponding pair of left and right scanlines of the received stereoscopic frame, decomposing the left and right scanlines into a left wavelet and a right wavelet, each of the wavelets being a sum of basis functions;
    establishing an initial disparity correspondence between the left wavelet and the right wavelet based on the generated disparity maps;
    refining the initial disparity between the left wavelet and the right wavelet using a phase difference between the corresponding wavelets; and
    reconstructing at least one novel view based on the left and right wavelets.

5. The method of claim 4, wherein the basis functions are of the form $$\hat{b}_f(\xi) = \cos\left(\frac{\pi}{2}\log_w(\xi/f)\right) \cdot \Pi\left(\frac{1}{2}\log_w(\xi/f)\right).$$

6. The method of claim 4, further comprising determining a per-wavelet disparity as an average of disparities in a local neighborhood of the wavelet, the size of which is substantially equal to spacing of associated wavelets.

7. The method of claim 6, wherein the per-wavelet disparity of a wavelet $\psi_{rfx}$ is given by $d_{rfx} = \Sigma_{y=x-s/2}^{x+s/2} |D_r(y)|/(s+1)$, where $s = |I_r|/|X_f|$, and $Dr(y)$ is a disparity map associated with the wavelet $\psi_{rfx}$.

8. The method of claim 4, wherein refining the initial disparity further comprises:
    transforming the phase difference into a disparity residual by multiplying the phase difference by $f/2\pi$, where f is a frequency associated with the wavelet;
    adding the disparity residual to the initial disparity determination to produce a per-wavelet refined disparity estimate.

9. The method of claim 8, further comprising filtering the per-wavelet disparity estimate using a two-dimensional mean filter having a kernel size equal to double wavelet spacing of neighboring wavelets.

10. The method of claim 4, wherein reconstructing at least one novel view comprises:
    determining a new position of each wavelet to specify a displaced wavelet, wherein the new position is $x + a \cdot d$, x being a location of the wavelet, d being a disparity of the wavelet and a being a constant;
    converting the displaced wavelet to be uniformly-spaced, using a non-uniform Fourier transform; and reconstructing a displaced one-dimensional scanline signal based on the displaced wavelet, using pyramid reconstruction.

11. A system for converting stereo video content to multi-view video content, comprising:
- a frame duplicator configured to receive a stereoscopic frame and produce a first stereoscopic frame copy and a second stereoscopic frame copy therefrom;
- a pyramid decomposition processor configured to receive the first stereoscopic frame copy and produce a first pyramid corresponding to the first stereoscopic frame copy and a second pyramid corresponding to the first stereoscopic frame copy;
- a disparity processor configured to receive the second stereoscopic frame copy, and decomposition information from the pyramid decomposition processor, and to produce disparity information therefrom;
- a re-projection processor configured to receive the first pyramid and the second pyramid from the pyramid decomposition processor, and disparity information from the disparity processor, and to produce pyramid re-projection information therefrom; and
- a pyramid reconstruction processor configured to receive the re-projection information from the wavelet re-projection processor and to produce at least one novel view therefrom.

12. The system of claim 11, wherein the pyramid decomposition processor produces the first pyramid and the second pyramid as a sum of basis functions having the form $$\hat{b}_f(\xi) = \cos\left(\frac{\pi}{2}\log_w(\xi/f)\right) \cdot \Pi\left(\frac{1}{2}\log_w(\xi/f)\right).$$

13. The system of claim 11, wherein the disparity processor (i) generates a disparity map for each of a left view and a right view of the stereoscopic frame and (ii) establishes an initial disparity correspondence between a left pyramid and a right pyramid based on the generated disparity maps.

14. The system of claim 11, wherein the disparity processor further refines the initial disparity between the left and right pyramid functions using a phase difference between the corresponding pyramid functions.

15. The system of claim 14, wherein the disparity processor determines a per-pyramid function disparity as an average of disparities in a local neighborhood of the pyramid function, the size of which is substantially equal to spacing of associated pyramid functions.

16. The system of claim 15, wherein the per-pyramid disparity $d_{rfx}$ of a pyramid function $\psi_{rfx}$ is given by $d_{rfx} = \Sigma_{y=x-s/2}^{x+s/2} |D_r(y)|/(s+1)$, where $s = |I_r|/|X_f|$, and $Dr(y)$ is a disparity map associated with the pyramid function $\psi_{rfx}$.

17. The system of claim 11, wherein the disparity processor further configured to:
- transform the phase difference into a disparity residual by multiplying the phase difference by $f/2\pi$, where f is a frequency associated with the pyramid;
- add the disparity residual to the initial disparity determination to produce a per-pyramid refined disparity estimate.

18. The system of claim 11, wherein the pyramid reconstruction processor is further configured to:
- determine a new position of each pyramid to specify a displaced pyramid, wherein the new position is $x+a\cdot d$, x being a location of the pyramid, d being a disparity of the pyramid and a being a constant;
- convert the displaced pyramid to be uniformly-spaced, using a non-uniform Fourier transform; and
- reconstruct a displaced one-dimensional scanline signal based on the displaced pyramid, using pyramid reconstruction.

19. A non-transitory computer-readable medium with computer code instruction stored thereon, the computer code instructions, when executed by a processor, cause an apparatus to:
- generate a disparity map for each of the left and right views of a received stereoscopic frame;
- for each corresponding pair of left and right scanlines of the received stereoscopic frame, decompose the left and right scanlines into a left wavelet and a right wavelet, each of the wavelets being a sum of basis functions;
- establish an initial disparity correspondence between the left wavelet and the right wavelet based on the generated disparity maps;
- refine the initial disparity between the left wavelet and the right wavelet using a phase difference between the corresponding wavelets; and
- reconstruct at least one novel view based on the left and right wavelets.

20. The non-transitory computer-readable medium of claim 19, wherein the basis functions are of the form $$\hat{b}_f(\xi) = \cos\left(\frac{\pi}{2}\log_w(\xi/f)\right) \cdot \Pi\left(\frac{1}{2}\log_w(\xi/f)\right).$$

* * * * *